(12) United States Patent
Makeeff

(10) Patent No.: US 6,190,252 B1
(45) Date of Patent: Feb. 20, 2001

(54) ROTOR FOR A COMBINE-HARVESTER

(76) Inventor: Russell Makeeff, 1039 - 8th Ave. NW., Mercer, ND (US) 58559

( * ) Notice: Under 35 U.S.C. 154(b), the term of this patent shall be extended for 0 days.

(21) Appl. No.: 09/208,923

(22) Filed: Dec. 10, 1998

(51) Int. Cl.[7] ............................ A01F 7/06; A01F 12/20
(52) U.S. Cl. .................. 460/69; 460/68; 460/80
(58) Field of Search ................. 460/66, 67, 68, 460/69, 75, 80, 90

(56) References Cited

U.S. PATENT DOCUMENTS

| | | | |
|---|---|---|---|
| 1,571,128 | * | 1/1926 | Lucas ........................... 460/66 |
| 2,493,105 | * | 1/1950 | Bunting ......................... 460/70 |
| 3,481,342 | * | 12/1969 | Rowland-Hill et al. ............. 460/68 |
| 4,266,560 | * | 5/1981 | Powell et al. ................... 460/68 |
| 4,505,279 | * | 3/1985 | Campbell et al. ................. 460/66 |
| 5,045,025 | * | 9/1991 | Underwood ....................... 460/66 |
| 5,919,086 | * | 7/1999 | Derry ........................... 460/72 |

FOREIGN PATENT DOCUMENTS

2024595A * 1/1980 (GB) ........................... 460/66

* cited by examiner

Primary Examiner—Thomas B. Will
Assistant Examiner—Meredith C. Petravick
(74) Attorney, Agent, or Firm—David A. Lingbeck

(57) ABSTRACT

A rotor used for a combine-harvester includes a cylindrical member having a front end and rear end with a plurality of rub bar members spacedly disposed thereupon and extending outwardly therefrom and with a plurality of outwardly projecting spiral members which are disposed about the rear portion of the cylindrical member and which effectively shed the vines and stalks of the crop plants from about the rotor and with a plurality of short threshing members which are mounted to and project outwardly from the cylindrical member at the rear end thereof for removing any grain left on the vines and stalks before they are removed off the rear end of the rotor.

11 Claims, 2 Drawing Sheets

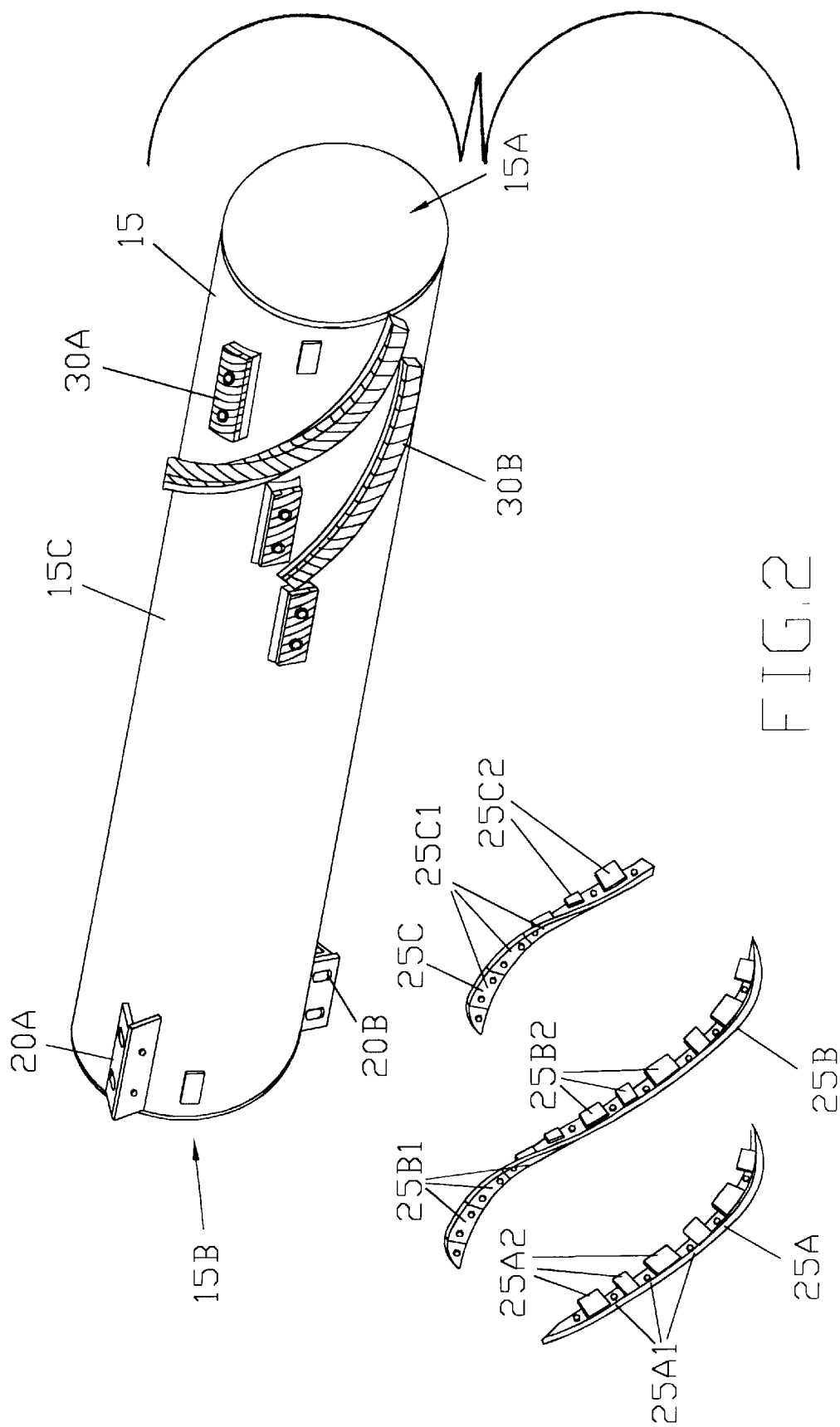

ROTOR FOR A COMBINE-HARVESTER

BACKGROUND OF THE INVENTION

This invention relates to an improved rotor for a combine harvester which effectively prevents vines and stalks of crop plants from wrapping about and binding up the rotor making it virtually impossible for the combine harvester to function properly.

Combine harvesters typically are used to harvest crops and some of the combine harvesters have a rotor which is disposed generally parallel to the direction of movement of the combine harvester. The rotor is generally used to separate the grain from the vine or stalk and to move the vine or stalk through the back end of the combine harvester. As the combine harvester moves through the field, the combine harvester severs the stalk or vine of the crop plant near the base thereof, and the stalk or vine is moved through the combine harvester and along the rotor which removes the grain from the vine or stalk with the grain being moved into a hopper and the vine or stalk being disposed of out the back end of the combine harvester.

The crop plants are best harvested when there is still some moisture content in the grain which also means that the vine and stalk will also have some moisture content. What typically happens is that the vine or stalk behaves similar to wire and tends to wrap about and essentially binds up the rotor thus causing the combine harvester to break down. In an attempt to solve this problem, the prior art includes a plurality of short generally rectangular members which are disposed parallel upon the rotor near the front end thereof and which are also spaced from one another about the rotor. Unfortunately, the vine and stalk from the crop plants have continued to wrap about and bind up the rotors of the prior art.

None of the prior art describes the present invention which substantially solves the problem of the vine and stalk wrapping about the rotor and causing the combine harvester to break down.

SUMMARY OF THE INVENTION

The present invention includes a conventional rotor having a front end and a back end and being rotatably mounted upon a shaft inside a combine-harvester and being disposed generally parallel to the direction of movement of the combine-harvester. The conventional rotor further includes a cylindrical member and a plurality of conventional rub members which includes a plurality of rectangular rub bar members conventionally attached to the exterior of the cylindrical member and being spaced thereabout and which further includes conventional spiral rub bar members conventionally attached to the exterior of the cylindrical member. These rub members are disposed about the front portion of the cylindrical member. Also, the rotor includes three threshing members which are disposed near the rear end of the rotor and which are spaced approximately 120 degrees apart form one another about the exterior of the rotor. Further the rotor comprises three spiral members each having a first end which is disposed at a respective threshing member, and each having a second end which is disposed at a respective rectangular rub bar member. The spiral members extend approximately 270 degrees about the exterior of the rotor and substantially prevent the vines and stalks of the crop plants from wrapping about and binding up the rotor.

One objective of the present invention is to provide a rotor for a combine-harvester which substantially prevents the vines and stalks of crop plants from wrapping about and binding up the rotor thus causing the combine-harvester to break down.

Another objective of the present invention is to provide a rotor for a combine-harvester which allows the combine-harvester to be operated at less engine power.

Yet another objective of the present invention is to provide a rotor for a combine-harvester which allows the user to harvest one's crops more quickly and effectively.

Further objectives and advantages of the present invention will become apparent as the description proceeds and when taken in conjunction with the accompanying drawings wherein:

BRIEF DESCRIPTION OF THE DRAWINGS

FIG. 2 is an exploded view of the rotor for a combine-harvester.

DETAILED DESCRIPTION OF THE INVENTION

Figure 1:
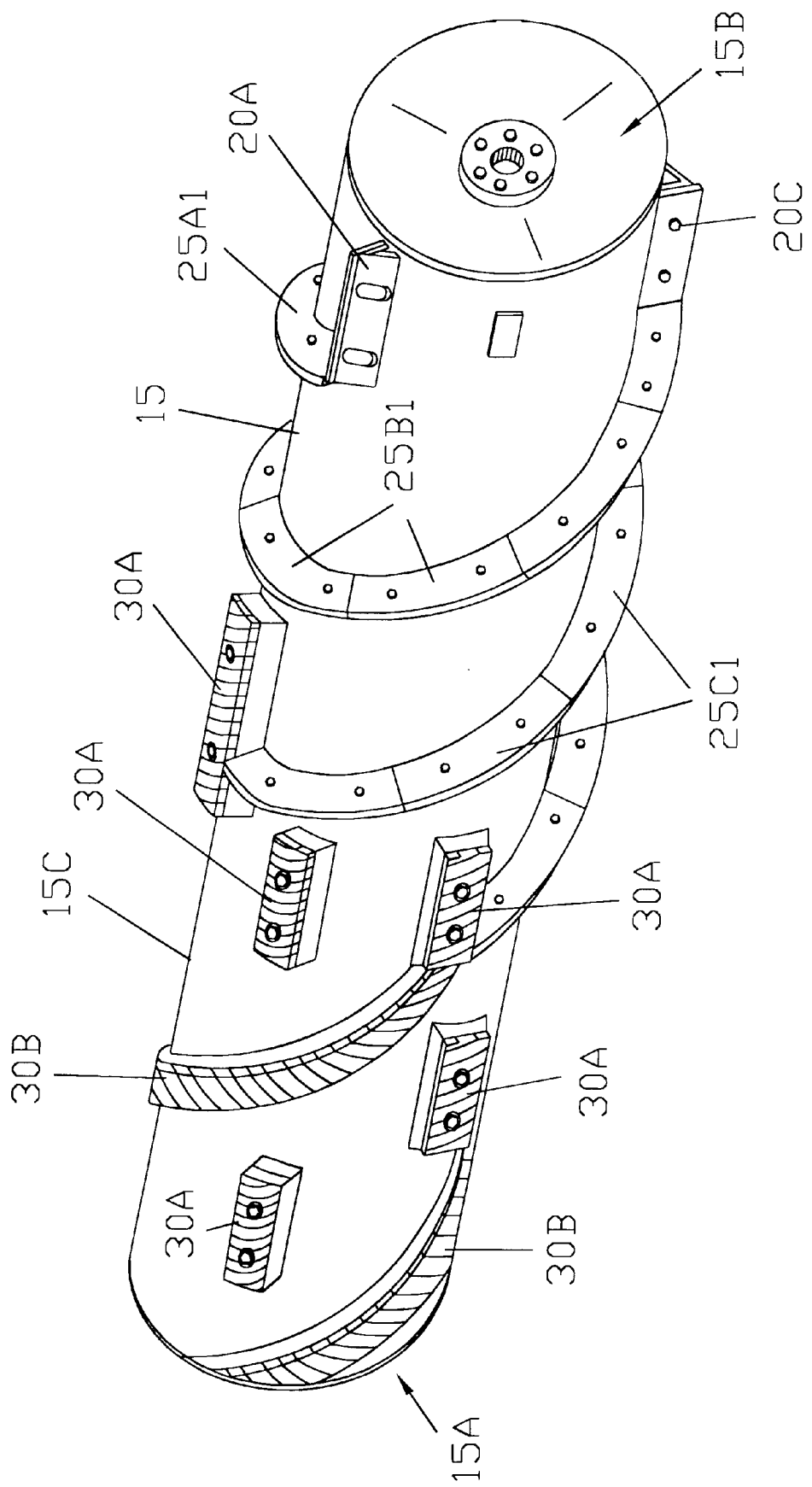
FIG. 1 is a perspective view of the rotor for a combine-harvester.

According to the drawings in FIGS. 1 & 2, in particular, the improved rotor for a combine-harvester comprises a cylindrical member 15 having a front end 15A and a rear end 15B and further has a bore extending therethrough, and also comprises a plurality of conventional rub bar members spacedly and securely disposed with conventional means about the exterior of the cylindrical member 15 with the conventional rub bar members further including a plurality of rectangular rub bar members 30A being disposed randomly about the outer wall 15C of the cylindrical member 15 and also being disposed longitudinally along the cylindrical member 15 and parallel to axis of the cylindrical member 15 and further being disposed about the front portion of the cylindrical member 15. In addition, the conventional rub bar members includes spiral rub bar members 30B which are conventionally secured to the exterior of the cylindrical member 15 and which have ends which terminate at the front end 15A of the cylindrical member 15 and at one or more rectangular rub bar members 30A. These conventional rub bar members essentially facilitate the removal of the grains from the crop plants which includes the vines and stalks as the crop plants are moved along and about the cylindrical member 15 from the front end 15A to the back end thereof. As the vines and stalks move past these rub bar members, they encounter three outwardly projecting spiral members 25A–C which are securely disposed about the rear portion of the cylindrical member 15 and which are spaced from one another. These spiral members 25A–C have first ends which terminate at respective rectangular rub bar members 30A, and also have second ends which terminate near the rear end 15B of the cylindrical member 15 approximately 120 degrees apart from one another.

Each of these spiral members 25A–C includes a plurality of angled anchor members 25A2–C2 which are spaced from one another and welded to the outer wall 15C of the cylindrical member 15 in a spiral pattern about the cylindrical member 15, and further includes a plurality of thin plate-like wear members 25A1–C1 being disposed end-to-end about the cylindrical member 15 and also being fastened with bolts or screws to and forward of the anchor members 25A2–C2 relative to the cylindrical member 15 with each plate-like wear member being disposed on end upon the outer wall 15C of the cylindrical member 15 such that each plate-like wear member is essentially perpendicular to the outer wall 15C of the cylindrical member 15. Each spiral member extends approximately 270 degrees about the cylindrical member 15 with the second ends of the spiral members 25A–C terminating at respective short fin-like threshing members 20 which are welded to the outer wall 15C of the cylindrical member 15 and which are spaced approximately 120 degrees from one another and which terminate at the rear end 15B of the cylindrical member 15.

Each of the short fin-like threshing members 20 includes a pair of slats 20A–B which have top ends which are in contact with one another, and which have bottom ends which are spaced from one another and securely and conventionally mounted upon the outer wall 15C of the cylindrical member 15, essentially forming an inverted V shape relative to the cylindrical member 15. The fin-like threshing members 20 are longitudinally disposed upon the cylindrical member 15 and parallel to the longitudinal axis of the cylindrical member 15.

In use, crop plants including the vines, stalks, and grains are moved along the rotor, and the grains are essentially rubbed off the stalks and vines by the plurality of rub bar members disposed about the front portion of the rotor. As the stalks and vines are moved along the rear portion of the rotor, the tendency of the stalks and vines is to wrap and bind about the rotor. However, the three spiral members 25A–C prevent the vines and stalks from wrapping about the rotor and essentially move the vines and stalks off the rear end 15B of the rotor. The plate-like wear members 25A1–C1 prevent the vines and stalks from even engaging about the rotor, and the vines and stalks wear along the plate-like wear members 25A1–C1 and any grains remaining on the stalks and vines are removed by the fin-like threshing members 20 before the stalks and vines are moved off the end of the rotor. No other rotor for a combine-harvester is capable of preventing the stalks and vines of crop plants from wrapping and binding about the rotor.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A rotor used for a combine-harvester comprising:

a cylindrical member having a front end, a rear end, and an outer wall;

a plurality of rub bar members conventionally secured to said outer wall and spaced thereabout;

a plurality of outwardly projecting spiral members securely mounted to said outer wall and spaced thereabout, said outwardly projecting spiral members being disposed about a rear portion of said cylindrical member, said outwardly projecting spiral members having first ends which terminate at respective said rub bar members, said outwardly projecting spiral members having second ends which terminate near said rear end of said cylindrical member, said second ends of said outwardly protecting spiral members being spaced approximately 120 degrees from one another, each of said outwardly projecting spiral members comprising a plurality of anchor members securely attached to said outer wall and spacedly arranged in a spiral pattern about said outer wall, and further comprising a plurality of thinly wear members which are removably fastened to said anchor members; and a plurality of threshing members securely mounted to said outer wall at said rear end, said second ends of said outwardly projecting spiral members terminating at respective said threshing members.

2. A rotor used for a combine-harvester as described in claim 1, wherein said thinly wear members are plate-like and are disposed end-to-end.

3. A rotor used for a combine-harvester as described in claim 2, wherein said plate-like wear members essentially extend perpendicular to said outer wall.

4. A rotor used for a combine-harvester as described in claim 3, wherein said plate-like wear members are disposed forwardly of said anchor members relative to said cylindrical member.

5. A rotor used for a combine-harvester as described in claim 4, wherein said anchor members have an angled portion to facilitate securely attaching said anchor members to said outer wall.

6. A rotor used for a combine-harvester comprising:

a cylindrical member having a front end, a rear end, and an outer wall;

a plurality of rub bar members conventionally secured to said outer wall and spaced thereabout;

a plurality of outwardly projecting spiral members securely mounted to said outer wall and spaced thereabout; and a plurality of threshing members securely mounted to said outer wall at said rear end, said threshing members being essentially fin-like.

7. A rotor used for a combine-harvester as described in claim 6, wherein each of said threshing members includes a pair of short slats each of which has a top and a bottom.

8. A rotor used for a combine-harvester as described in claim 7, wherein each pair of said short slats are attached to another so as to form an inverted V shape upon said cylindrical member with said tops of each pair of said short slats being in contact with one another.

9. A rotor used for a combine-harvester as described in claim 8, wherein said threshing members are disposed approximately 120 degrees from one another about said cylindrical member.

10. A rotor used for a combine-harvester as described in claim 9, wherein said threshing members are disposed longitudinally upon said cylindrical member and are disposed parallel to a longitudinal axis of said cylindrical member.

11. A rotor used for a combine-harvester as described in claim 10, wherein said threshing members extend forwardly from said rear end of said cylindrical member.

* * * * *